US012126733B2

(12) United States Patent
Qiu et al.

(10) Patent No.: US 12,126,733 B2
(45) Date of Patent: Oct. 22, 2024

(54) INTERACTIVE AGGREGATE SIGNATURE METHOD, AND DEVICE AND STORAGE MEDIUM (71) Applicant: HANGZHOU QULIAN TECHNOLOGY CO., LTD., Zhejiang (CN)

(72) Inventors: Weiwei Qiu, Zhejiang (CN); Wei Li, Zhejiang (CN); Kejie Zhang, Zhejiang (CN); Fanglei Huang, Zhejiang (CN); Xiaoke Wang, Zhejiang (CN)

(73) Assignee: HANGZHOU QULIAN TECHNOLOGY CO., LTD., Zhejiang (CN)

( * ) Notice: Subject to any disclaimer, the term of this patent is extended or adjusted under 35 U.S.C. 154(b) by 238 days.

(21) Appl. No.: 17/854,090

(22) Filed: Jun. 30, 2022

(65) Prior Publication Data
US 2022/0337429 A1 Oct. 20, 2022

Related U.S. Application Data (63) Continuation-in-part of application No. PCT/CN2020/113765, filed on Sep. 7, 2020.

(30) Foreign Application Priority Data

Jun. 22, 2020 (CN) .......................... 202010576192.6

(51) Int. Cl.
H04L 9/32 (2006.01)
H04L 9/08 (2006.01)
H04L 9/00 (2022.01)

(52) U.S. Cl.
CPC .......... H04L 9/3247 (2013.01); H04L 9/0869 (2013.01); H04L 9/3271 (2013.01); H04L 9/00 (2013.01)

(58) Field of Classification Search
CPC ... H04L 9/3247; H04L 9/3271; H04L 9/0869; H04L 9/3255; H04L 9/50
See application file for complete search history.

(56) References Cited

U.S. PATENT DOCUMENTS 10,397,002 B2 * 8/2019 Camenisch ......... H04L 63/0428
2018/0234253 A1 8/2018 Camenisch et al.
(Continued)

FOREIGN PATENT DOCUMENTS

CN 110012443 A 7/2019
CN 110300172 A 10/2019
(Continued)

OTHER PUBLICATIONS

"High-Speed High-Security Signatures"—Bernstein et al., Dept. of Computer Science, UIC, Department of Mathematics and Computer Science, Technische Universiteit Eindhoven, Sep. 26, 2011 https://eprint.iacr.org/2011/368 (Year: 2011).*
(Continued)

Primary Examiner — Randy A Scott
(74) Attorney, Agent, or Firm — Brooks Kushman P.C.

(57) ABSTRACT

Disclosed are an interactive aggregate signature method, and a device and a storage medium, which relate to the technical field of data encryption. The method comprises: S101, generating a challenge number according to random numbers of all participating terminals, and respectively sending the random numbers corresponding to the participating terminals, the challenge number and a proposal message to corresponding participating terminals; S102, receiving a message from the participating terminals, and if partial signatures are included in the message, recording the partial signatures; S103, determining whether the number of recorded partial signatures reaches a number required for passing of the proposal message; if so, proceeding to S104, involving generating an aggregate signature by means of the
(Continued)

partial signatures; and if not, outputting that the proposal message fails to be passed and an aggregate signature cannot be generated, or repeating steps S101 to S103.

12 Claims, 5 Drawing Sheets

(56) References Cited

U.S. PATENT DOCUMENTS

| 2020/0059369 | A1* | 2/2020 | Li | H04L 9/0643 |
| 2020/0213099 | A1* | 7/2020 | Wright | H04L 9/0637 |
| 2021/0097537 | A1* | 4/2021 | Guo | H04L 9/0836 |

FOREIGN PATENT DOCUMENTS

| CN | 110322246 A | 10/2019 |
| CN | 110401541 A | 11/2019 |
| CN | 110505064 A | 11/2019 |
| CN | 110708163 A | 1/2020 |
| CN | 110798308 A | 2/2020 |
| CN | 210745178 U | 6/2020 |
| CN | 111478775 A | 7/2020 |
| JP | 2005311623 A | 11/2005 |
| JP | 2019212241 A | 12/2019 |
| JP | 2020517169 A | 6/2020 |
| WO | 2008075420 A1 | 6/2008 |
| WO | 2017186317 A1 | 11/2017 |

OTHER PUBLICATIONS

"Improving the Trustworthiness of Electronic Voting Systems Using Blockchain"—Brandon David Anderson, Dept. of Science, UIC, Arizona State Univ., May 2020 https://keep.lib.asu.edu/system/files/c7/224327/Anderson_asu_0010N_19616.pdf (Year: 2020).*
International Search Report for PCT/CN2020/113765, Prepared by the China National Intellectual Property Administration, mailing date Mar. 10, 2021, 4 pages with English Translation.
Bernstein D. J. et al.; High-speed high-security signatures, Journal Cryptogr Eng 2, 77-89 (2012). https://doi.org/10.1007/s13389-012-0027-1, published Aug. 2012, 23 pages.

* cited by examiner

INTERACTIVE AGGREGATE SIGNATURE METHOD, AND DEVICE AND STORAGE MEDIUM

CROSS REFERENCE TO RELATED APPLICATIONS

This application is a continuation-in-part of PCT Application No. PCT/CN2020/113765 filed on Sep. 7, 2020, which claims priority to Chinese Patent Application No. 202010576192.6 filed on Jun. 22, 2020, the contents of which are incorporated herein by reference thereto.

TECHNICAL FIELD

The present disclosure relates to the technical field of data encryption, and particularly to an interactive aggregate signature method, an interactive aggregate signature device and a storage medium.

BACKGROUND

Digital signatures are already an indispensable part of a computer system. No matter in identity authentication or communication encryption, the digital signature is a core thereof. The digital signature cryptographically ensures that the identity cannot be forged and the data cannot be tampered. This is of great significance to establishment of a credit society.

In a voting system, multiple participating terminals independently vote on a proposal and sign the proposal with their own digital certificates. An aggregate signature algorithm is an algorithm that combines multiple signatures into one signature. By aggregating signatures, a size of the signature can be reduced, thereby reducing a block size of a blockchain system that requires frequent use of multiple signatures, so the aggregate signature is of great significance. The current aggregation signature algorithms are mainly based on two different principles, and there are two different implementations, namely, a non-interactive aggregate signature and an interactive aggregate signature. The non-interactive aggregate signatures are based on a property of bilinear mapping. Among them, the BLS aggregate signature algorithm is the most common non-interactive aggregate signature algorithm. This type of algorithm does not require additional message transmission, and its signature and signature verification are relatively simple, but the speed of the signature and the signature verification is much slower than signatures based on an elliptic curve. The interactive aggregate signature algorithm is based on a Schnorr multi-signature and signature verification solution, this solution requires three times of message interactions and is affected by network delay, but the verification speed of an aggregated signature is significantly faster than the BLS aggregate signature algorithm.

In the blockchain system, all nodes need to frequently vote on a large number of proposals. In order to prove validity of one proposal, it is necessary to prove that a sufficient number of nodes have signed for this proposal. This can be easily verified by providing an aggregate signature of this proposal. However, if calculations of these aggregate signatures are considered separately, then the effect will not be satisfactory no matter which kind of the above aggregate signature algorithms is selected.

SUMMARY

With regard to the technical problem existed in the prior art that there is no access to perform a large number of aggregate signature calculations efficiently in the blockchain system, the present disclosure provides an interactive aggregate signature method, a device, and a storage medium, which can efficiently perform a large number of aggregate signature calculations.

In order to solve the above problem, technical solutions provided by the present disclosure are as follows.

An interactive aggregate signature method applied to a node corresponding to an initiating terminal, includes: at S101, generating a challenge number according to random numbers of all participating terminals, and sending the random numbers corresponding to the participating terminals, the challenge number and a proposal message to the corresponding participating terminals respectively; at S102, receiving messages from the participating terminals, and recording the partial signatures if the messages contain partial signatures; at S103, determining whether quantity of the recorded partial signatures meets quantity required for approval of the proposal message; if the quantity of the recorded partial signatures meets the quantity required for the approval of the proposal message, then at S104 generating an aggregate signature based on these partial signatures; if the quantity of the recorded partial signatures does not meet the quantity required for the approval of the proposal message, then outputting that the proposal message is not approved and there is no access to generate the aggregate signature, or repeating the S101, S102 and S103.

Optionally, between the S101 and the S102, each of the participating terminals receives an message sent by the initiating terminal and containing the corresponding random number, the challenge number and the proposal message, and determines whether a local random number is consistent with the corresponding random number in the message; if the local random number is consistent with the corresponding random number in the message and the proposal message is agreed, then the corresponding partial signature is generated for the proposal message and a new random number is generated, and a message containing the corresponding partial signature and the new random number is sent to the initiating terminal; if the local random number is consistent with the corresponding random number in the message and the proposal message is not agreed, then a message that the proposal message is refused is sent to the initiating terminal; if the local random number is not consistent with the corresponding random number in the message, then no signature is provided for the proposal message and the local random number is sent to the initiating terminal.

Optionally, a premise of repeating the S101, the S102 and the S103 is that: if the partial signatures, the quantity of which is required for the approval of the proposal message, have not been received after a set response time, then a sum of quantity of a node of the participating terminal that does not respond and quantity of a node of the participating terminal that refuses the proposal message is determined, and the S101, S102 and S103 are repeated if the sum is less than quantity required for refusal of the proposal message, otherwise that the proposal message is not approved and that there is no access to generate the aggregate signature are output.

Optionally, the generating the challenge number according to the random numbers of all participating terminals further includes: generating the challenge number according to the random numbers of all participating terminals by using an Ed25519 algorithm.

Optionally, the generating the partial signatures for the proposal message further includes: generating the partial signatures for the proposal message by using an Ed25519 algorithm.

Optionally, the S102 further includes recording the new random number of the corresponding participant, so as to update a random number list of the participating terminals.

Optionally, an update method of the random number list of the participating terminals includes the S101 and the S102.

An interactive aggregate signature method applied to a node corresponding to a participating terminal, includes: at S201, receiving an message sent by an initiating terminal and containing a random number, a challenge number and a proposal message; and determining whether a local random number is consistent with the random number in the message; if the local random number is consistent with the random number in the message and the proposal message is agreed, then at S202 generating a partial signature for the proposal message and generating a new random number, and sending a message containing the partial signature and the new random number to the initiating terminal; if the local random number is consistent with the random number in the message and the proposal message is not agreed, then at S203 sending a message that the proposal message is refused to the initiating terminal; if the local random number is not consistent with the random number in the message, then at S204 providing no signature for the proposal message and sending the local random number to the initiating terminal.

Optionally, the generating the partial signature for the proposal message further includes: generating the partial signature for the proposal message by using an Ed25519 algorithm.

Additionally, the present disclosure provides a device, which includes: one or more processors; and a memory configured to store one or more programs, here the one or more programs cause the one or more processors to implement the method described above when executed by the one or more processors.

Additionally, the present disclosure provides a non-transitory computer-readable storage medium having stored a computer program thereon, and the computer program is executed by a processor to implement steps of any of the interactive aggregate signature methods described above.

Compared with the prior art, the technical solutions adopted by the present disclosure are provided with the following beneficial effect:

the efficiency of the aggregate signature calculations in scenarios where aggregate signatures are used extensively can be effectively reduced, and the performance of the system that uses the aggregate signatures can be improved.

DETAILED EMBODIMENTS

In order to further understand the contents of the present disclosure, the present disclosure will be described in detail with reference to the accompanying drawings and embodiments.

The present disclosure will be further described in detail below with reference to the accompanying drawings and embodiments. It should be understood that the specific embodiments described herein are only used to explain the related disclosure, but not to limit the present disclosure. In addition, it should be noted that, for ease of description, only the parts related to the present disclosure are shown in the drawings. The terms such as "first" and "second" etc. mentioned in the present disclosure are provided for the convenience of describing the technical solutions of the present disclosure, and are not provided with a specific limiting function, and these terms are all general references and do not constitute a limiting function on the technical solutions of the present disclosure. It should be noted that the embodiments in the present disclosure and the features in the embodiments can be combined with each other if there is no conflict. Hereinafter, the present disclosure will be described in detail with reference to the accompanying drawings and in conjunction with the embodiments.

First Embodiment

Figure 5:
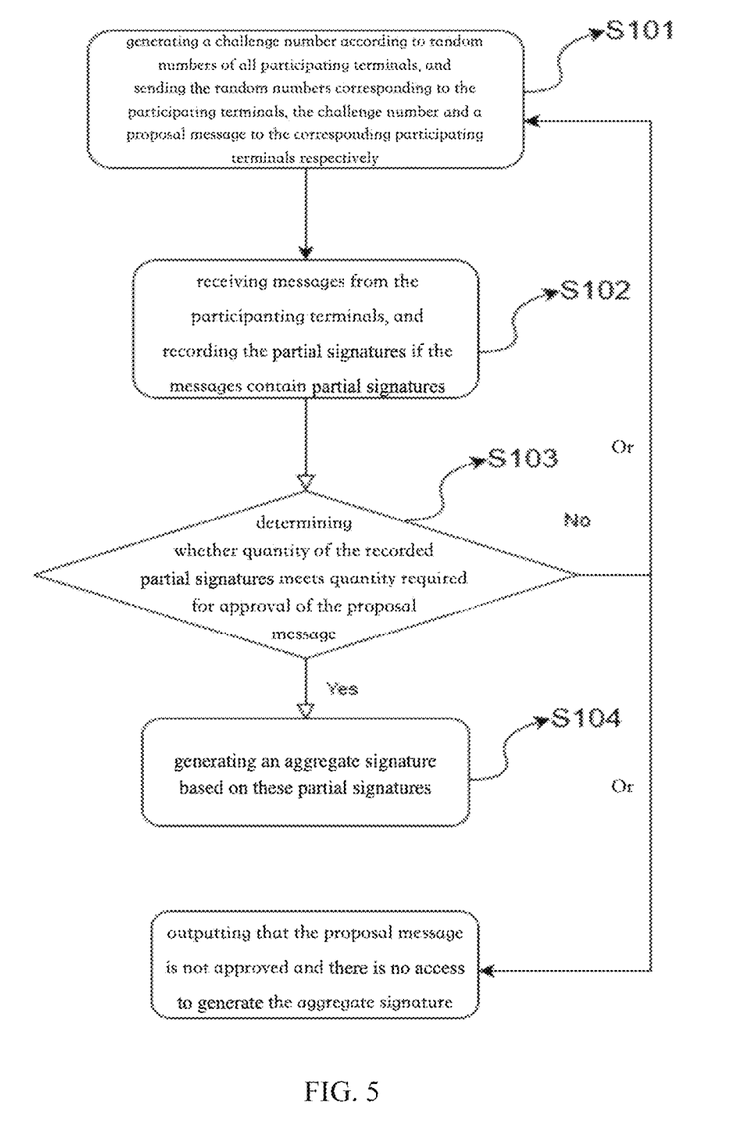
FIG. 5 is a flowchart of an interactive aggregate signature method applied to a node where the initiating terminal is according to an embodiment of the present disclosure.

This embodiment provides an interactive aggregate signature method applied to a node corresponding to an initiating terminal, as shown in FIG. 5, the method includes: at S101, generating a challenge number according to random numbers of all participating terminals, and sending the random numbers corresponding to the participating terminals, the challenge number and a proposal message to the corresponding participating terminals respectively; at S102, receiving messages from the participating terminals, and recording the partial signatures if the messages contain partial signatures; at S103, determining whether quantity of the recorded partial signatures meets quantity required for approval of the proposal message; if the quantity of the recorded partial signatures meets the quantity required for the approval of the proposal message, then at S104 generating an aggregate signature based on the partial signatures; if the quantity of the recorded partial signatures does not meet the quantity required for the approval of the proposal message, then outputting that the proposal message is not approved and the aggregate signature cannot be generated, or repeating the S101, S102 and S103. Here, between S101 and S102, the participating terminal receives an message sent by the initiating terminal and containing the random number, the challenge number and the proposal message; it is determined whether a local random number is consistent with the random number in the message; if the local random number is consistent with the random number in the message and the proposal message is agreed, then the partial signatures are generated for the proposal message and a new random number is generated; a message containing the partial signatures and the new random number is sent to the initiating terminal; if the local random number is consistent with the random number in the message and the proposal message is not agreed, then a message that the proposal message is refused is sent to the initiating terminal; if the local random number is not consistent with the random number in the message, then no signature is provided for the proposal message and the local random number is sent to the initiating terminal.

Figure 6:
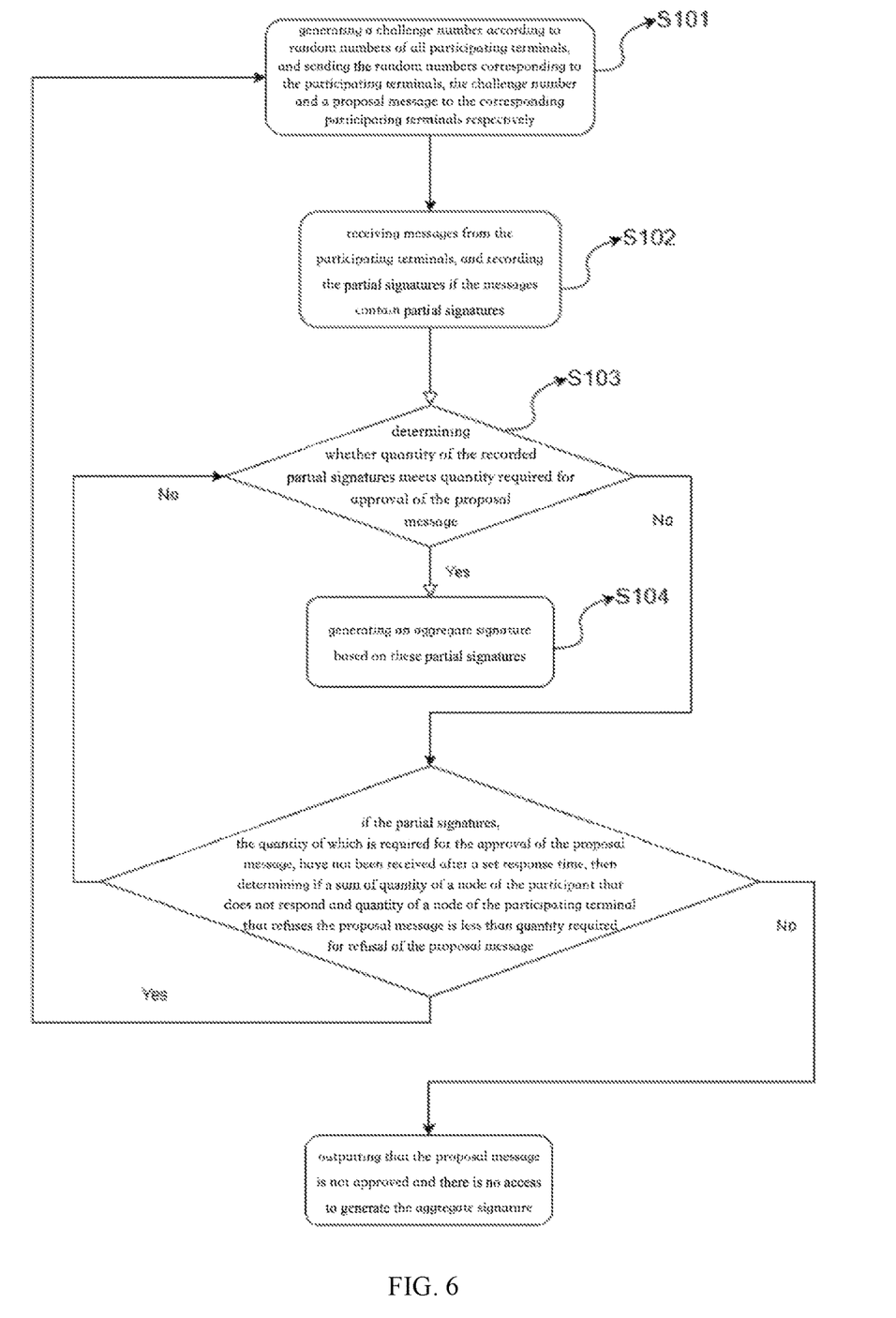
FIG. 6 is a flowchart of an interactive aggregate signature method applied to a node where a initiating terminal is according to another embodiment of the present disclosure.

A premise of repeating the S101, S102 and S103 is that: if the partial signatures, the quantity of which is required for the approval of the proposal message, have not been received after a set response time, and if a sum of quantity of a node of the participating terminal that does not respond and quantity of a node of the participating terminal that refuses the proposal message is less than quantity required for refusal of the proposal message, then the S101, S102 and S103 are repeated; otherwise, that the proposal message is not approved and that there is no access to generate the aggregate signature are output, which is as shown in FIG. 6.

The generating the challenge number according to the random numbers of all participating terminals further includes: generating the challenge number according to the random numbers of all participating terminals by using an Ed25519 algorithm. Specifically, the challenge number is generated through summing the random numbers of all the participating terminals by using an Ed25519 elliptic curve rule.

The generating the partial signatures for the proposal message further includes: generating the partial signatures for the proposal message by using an Ed25519 algorithm.

The S102 further includes recording new random numbers of the participating terminals, so as to update a random number list of the participating terminals. The method for updating the random number list of the participating terminals includes the S101 and the S102. The random number list of the participating terminals is composed of the new random numbers of the multiple participating terminals recorded by the initiating terminal.

Figure 7:
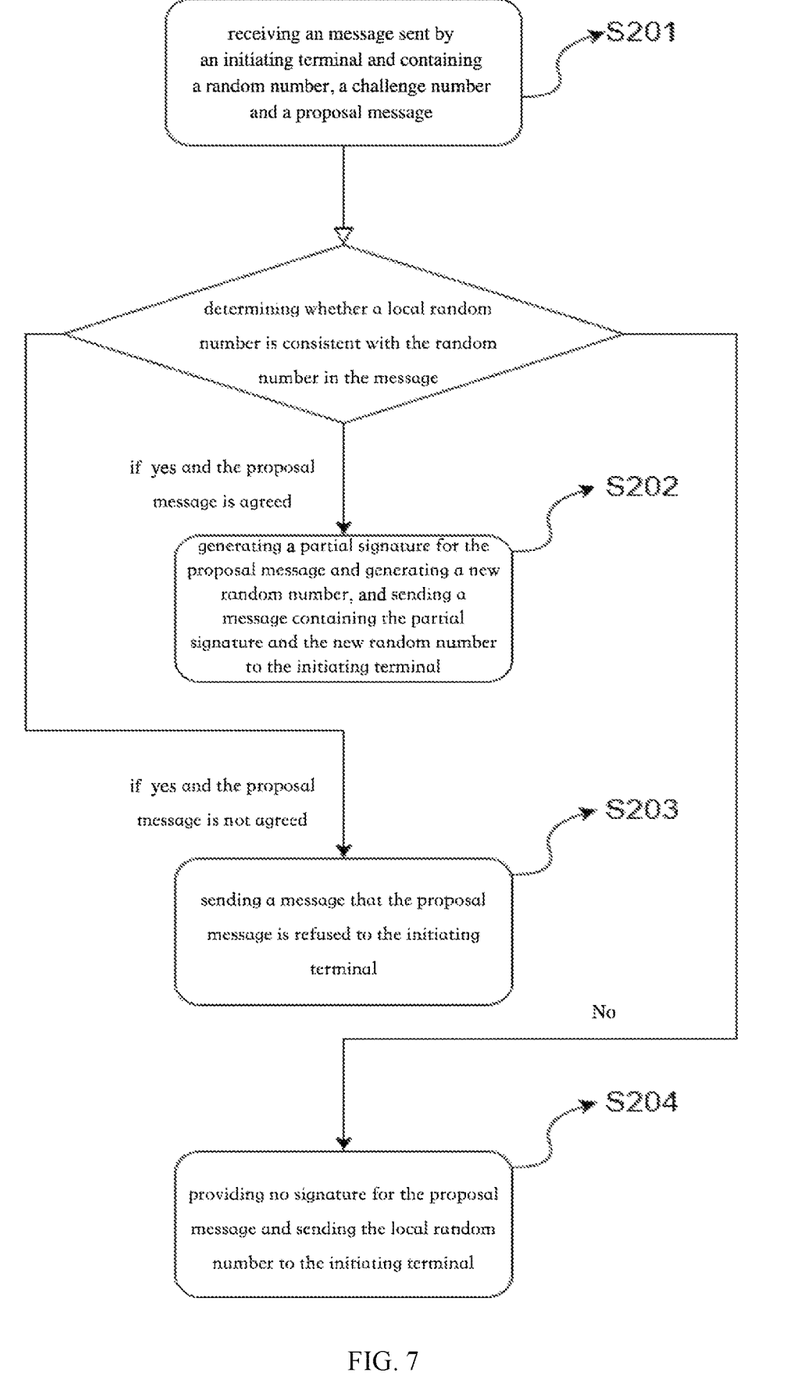
FIG. 7 is a flowchart of an interactive aggregate signature method applied to a node where a participating terminal is according to an embodiment of the present disclosure.

An interactive aggregate signature method applied to a node corresponding to the participating terminal, as shown in FIG. 7, includes:

at S201, receiving an message sent by the initiating terminal and containing the random number, the challenge number and the proposal message; determining whether a local random number is consistent with the random number in the message; if the local random number is consistent with the random number in the message and the proposal message is agreed, then at S202 generating the partial signature for the proposal message and generating a new random number; sending a message containing the partial signature and the new random number to the initiating terminal; if the local random number is consistent with the random number in the message and the proposal message is not agreed, then at S203 sending a message that the proposal message is refused to the initiating terminal; if the local random number is not consistent with the random number in the message, then at S204 providing no signature for the proposal message and sending the local random number to the initiating terminal. The generating the partial signature for the proposal message further includes: generating the partial signature for the proposal message by using an Ed25519 algorithm.

Figure 1:
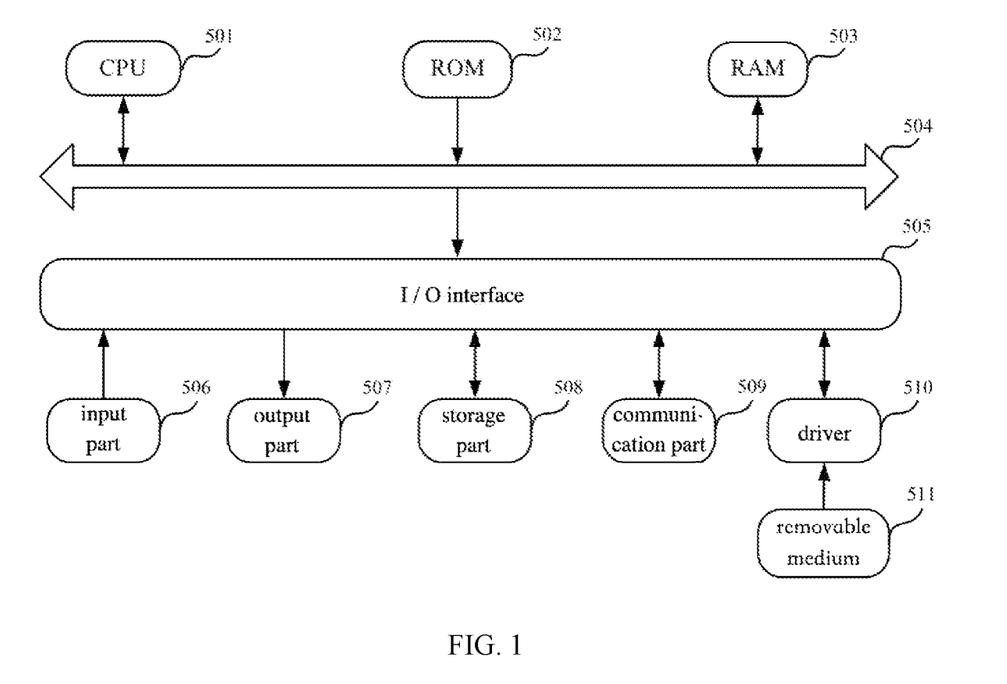
FIG. 1 is a structural schematic diagram of a device of the present disclosure.
Figure 2:
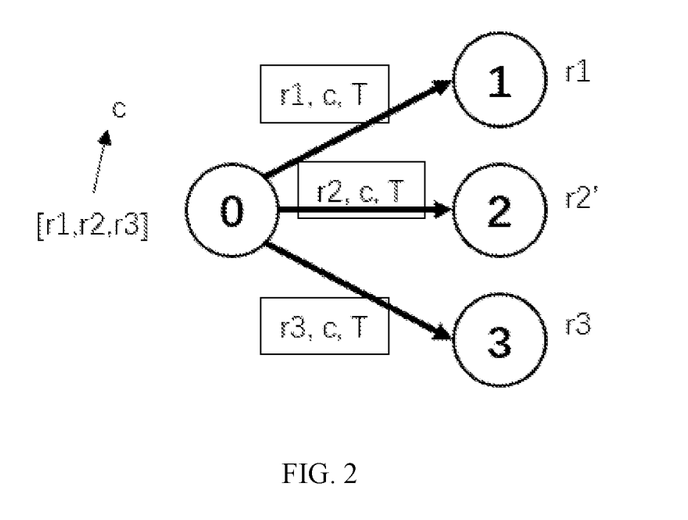
FIG. 2 is a schematic diagram that an initiating terminal sends proposal information to participating terminals.
Figure 3:
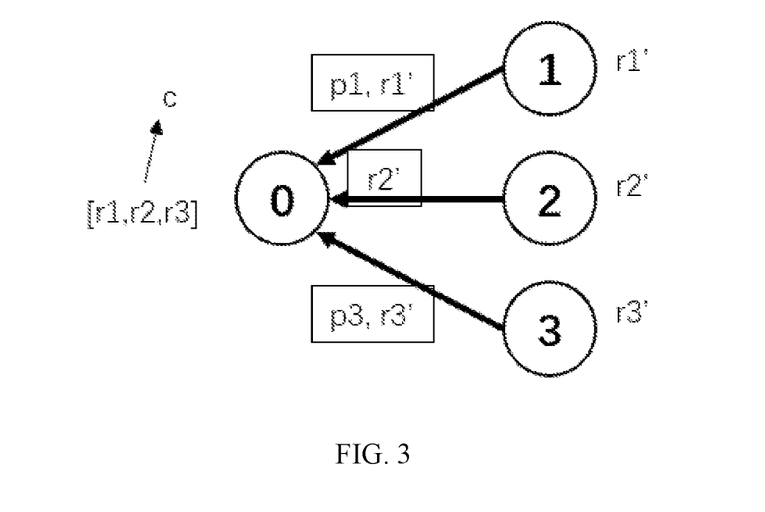
FIG. 3 is a schematic diagram that the participating terminals accept the proposal information and send partial signatures to the initiating terminal.

As an optional implementation, a method for pipelining interactive aggregate signature calculations, as shown in FIGS. 1-3, includes following steps.

At S1, assume by the initiating terminal that the random numbers of all participating terminals are 0 at a beginning of the system. When the initiating terminal has a new proposal for which voting is to be initiated, the initiating terminal generates the challenge number according to the random numbers of all participating terminals based on a challenge number generation method in Ed25519, and sends the random numbers of the participating terminals, the challenge number and the proposal message to the corresponding participating terminals respectively.

At S2, when receiving the message from the initiating terminal, the participating terminal first determines whether its local random number is consistent with the random number in the message. If its local random number is consistent with the random number in the message and the proposal is agreed, the participating terminal will generate the partial signatures for the proposal message through a partial signature generation algorithm in Ed25519, and generate a new random number to be recorded locally, and send the partial signatures and the new random number to the initiating terminal; if its local random number is consistent with the random number in the message and the proposal is not agreed, then send a message that the proposal is refused to the initiating terminal; if its local random number is not consistent with the random number in the message, then send by the participating terminal only the local random number to the initiating terminal without signing the proposal.

At S3, the initiating terminal receives the message from the participant, and records the message if the message contains the partial signatures. If the quantity of the recorded partial signatures reaches the quantity required for the approval of the proposal, the initiating terminal uses a signature aggregation method in Ed25519 to aggregate the partial signatures into an aggregate signature. If the message contains the random number, then the current newest random number list of the participating terminal recorded by the initiating terminal is updated; if adequate quantity of the partial signatures have not been received after a maximum response time T, and if a sum of quantity of a node that does not respond and quantity of a node that refuses the proposal is less than the quantity required for refusal of the proposal, the initiating terminal will re-initiate voting for the proposal according to the S1.

As an optional implementation, in the aforementioned S1, the initiating terminal does not need to correctly configure the random numbers of all participating terminals at initiation of the system, but dynamically updates the random number list of the participating terminals through the S2 and the S3. This can simplify the configuration of system initialization and increase the security of the system.

As an optional implementation, in the aforementioned S2, when the participating terminal agrees to the proposal, the participating terminal will not only send the partial signatures to the initiating terminal, but also send a random number required for a next proposal to the initiating terminal. In this way, through the pipelining, the signature for the next proposal is prepared in advance while signature is performed for this proposal, thereby reducing transmission of one message.

As an optional implementation, in the aforementioned S3, the initiating terminal may generate the aggregate signature of the corresponding proposal as long as sufficient quantity of partial signatures are received, without waiting for replies from all participating terminals. Through this optimization, the initiating terminal can generate the aggregate signatures faster, so as to initiate a next proposal request earlier and improve the efficiency of the system. At the same time, this also avoids a situation where the initiating terminal waits indefinitely for voting of a failed node due to failure of some participating terminals.

As an optional implementation, in the aforementioned S3, when there is insufficient quantity of votes, the initiating terminal will determine whether there is a possibility for approval of the proposal. Through updating the random number list of the participating terminals, the initiating terminal re-initiates voting for this proposal, and a normal node will not be unable to vote due to inconsistent random numbers. This ensures that the aggregate signature must be able to be generated for this proposal eventually as long as sufficient quantity of normal nodes agree to this proposal.

As shown in FIG. 2, the initiating terminal 0 generates the challenge number c according to the random numbers r1, r2 and r3 of the participating terminals recorded locally, and sends the random numbers of the corresponding participating terminals, the challenge number and the proposal T to the corresponding participating terminals.

As shown in FIG. 3, the participating terminal 1 receives the message from the initiating terminal and finds that the random number in the message and the local random number are both r1, and the participating terminal agrees to the proposal, then, the participating terminal 1 calculates a part p1 and generates a new random number r1', and sends (p1, r1') to the initiating terminal; the participating terminal 2 receives the message from the initiating terminal and finds that the random number r2 in the message is inconsistent with the local random number r2', then the participating terminal 2 sends r2' to the initiating terminal; the participating terminal 3 and the participating terminal 1 perform the same logic.

Figure 4:
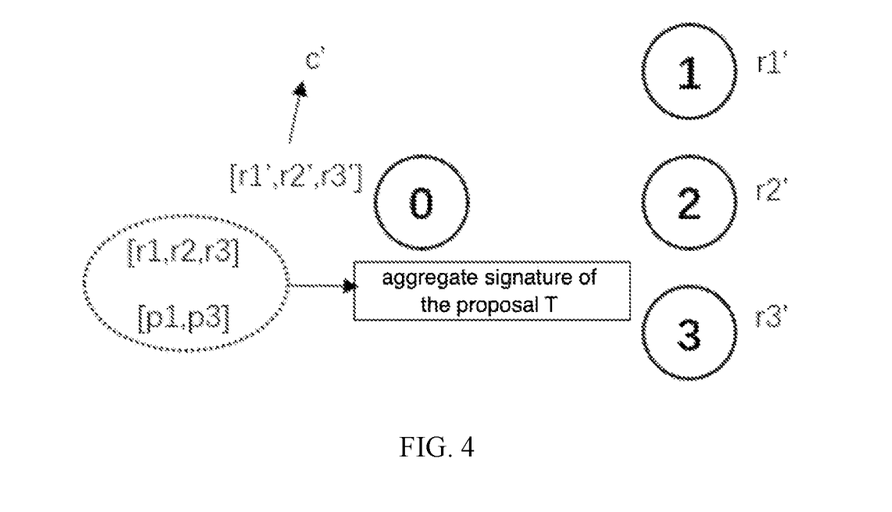
FIG. 4 is a schematic diagram that the initiating terminal generates an aggregate signature and updates a local random number list.

As shown in FIG. 4, the initiating terminal 0 receives the partial signatures of the participating terminal 1 and the participating terminal 3, if only two people are needed to agree to the proposal T, then the initiating terminal may generate the aggregate signature for this proposal T through r1, r2, r3 and p1, p3; at the same time, the initiating terminal will further update the local random number list as [r1',r2', r3'] according to the random numbers in the message. Therefore, if there is a new proposal, a process similar to FIG. 2 is executed according to the new random number list.

This method can effectively reduce the efficiency of the aggregate signature calculations in scenarios where aggregate signatures are used extensively, and improve the performance of the system that uses the aggregate signatures.

Second Embodiment

This embodiment provides a device which includes: one or more processors; a memory configured to store one or more programs, when the one or more programs are executed by the one or more processors, the one or more processors are caused to execute the method as described above.

Additionally, this embodiment provides a storage medium storing a computer program, the program, when executed by a processor, implements the method described in the above first embodiment.

FIG. 1 is a structural schematic diagram of a device provided by an embodiment of the present disclosure.

As shown in FIG. 1, as another aspect, the present disclosure further provides a device 500, which includes one or more central processing units (CPU) 501 that are capable of executing various appropriate actions and processing based on a program stored in a read-only memory (ROM) 502 or a program loaded from a storage part 508 into a random access memory (RAM) 503. Various programs and data required for operations of the device 500 are also stored in the RAM 503. The CPU 501, the ROM 502, and the RAM 503 are connected to each other through a bus 504. An input/output (I/O) interface 505 is also connected to the bus 504.

The following components are connected to the I/O interface 505: an input part 506 including a keyboard, a mouse, etc.; an output part 507 including a cathode ray tube (CRT), a liquid crystal display (LCD), etc., and a speaker etc.; a storage part 508 including a hard disk, etc.; and a communication part 509 including a network interface card such as a LAN card, a modem, etc. The communication part 509 performs communication processing via a network such as the Internet. A driver 510 is also connected to the I/O interface 505 as needed. A removable medium 511, such as a magnetic disk, an optical disk, a magneto-optical disk, a semiconductor memory, etc., is installed on the drive 510 as needed, so that the computer program read from it is installed into the storage part 508 as needed.

In particular, according to the embodiments disclosed in the present disclosure, the method described in any of the above embodiments may be implemented as a computer software program. For example, an embodiment disclosed in the present disclosure includes a computer program product, which includes a computer program tangibly contained on a machine-readable medium, and the computer program includes a program code for executing the method described in any of the foregoing embodiments. In such an embodiment, the computer program may be downloaded from the network through the communication part 509 and installed, and/or installed from the removable medium 511.

As yet another aspect, the present disclosure further provides a computer-readable storage medium. The computer-readable storage medium may be a computer-readable storage medium included in the device of the above-mentioned embodiment, or may be a computer-readable storage medium separately existed and not equipped into the device. The computer-readable storage medium stores one or more programs, and one or more processors use the programs to execute the method described in the present disclosure.

The flowcharts and block diagrams in the accompanying drawings illustrate possible implementations of system architectures, functions and operations of the system, the method and the computer program product according to various embodiments of the present disclosure. In this regard, each block in the flowcharts or block diagrams may represent a part of a module, a program segment, or a code, and the part of the module, the program segment or the code contains one or more executable instructions configured to realize a specified logic function. It should also be noted that, in some alternative implementations, the functions marked in the blocks may also occur in a different sequence from the sequence marked in the accompanying drawings. For example, two blocks as shown one after another may actually be executed substantially in parallel, and they may sometimes be executed in a reverse sequence, depending on the function involved. It should also be noted that each block in the block diagrams and/or the flowcharts and a combination of the blocks in the block diagrams and/or the flowcharts may be implemented by a dedicated hardware-based system that performs a specified function or operation, or may be realized by a combination of dedicated hardware and a computer instruction.

The involved units or modules described in the embodiments of the present disclosure may be implemented in software or hardware. The described units or modules may also be provided in a processor. For example, each of the described units may be a software program provided in a computer or a mobile smart device, or may be a separately configured hardware device. Among them, the names of these units or modules do not constitute a limitation on the units or modules themselves under certain circumstances.

The above description only includes preferred embodiments of the present disclosure and is an explanation of the applied technical principles. Those skilled in the art should understand that the invention scope involved in the present disclosure is not limited to the technical solutions formed by the specific combinations of the above technical features, and should also cover other technical solutions formed by arbitrarily combining the above technical features or the equivalent features thereof without departing from the concept of the present disclosure, for example, a technical solution formed by replacing the above-mentioned features with the technical features that are disclosed in the present disclosure and are (but not limited to) provided with similar functions.

What is claimed is:

1. An interactive aggregate signature method applied to a node corresponding to an initiating terminal, comprising:
    at S101, generating a challenge number according to random numbers of all participating terminals, and sending the random numbers corresponding to the participating terminals, the challenge number and a proposal message to the corresponding participating terminals respectively;
    at S102, receiving messages from the participating terminals, and recording the partial signatures if the messages contain partial signatures;
    at S103, determining whether quantity of the recorded partial signatures meets quantity required for approval of the proposal message;
    if the quantity of the recorded partial signatures meets the quantity required for the approval of the proposal message, then at S104 generating an aggregate signature based on by combining these partial signatures;
    if the quantity of the recorded partial signatures does not meet the quantity required for the approval of the proposal message, then outputting that the proposal message is not approved and there is no access to generate the aggregate signature, or repeating the S101, S102, and S103;
    wherein:
    between the S101 and the S102, each of the participating terminals receives a message sent by the initiating terminal and containing the corresponding random number, the challenge number and the proposal message, and determines whether a local random number is consistent with the corresponding random number in the message;
    if the local random number is consistent with the corresponding random number in the message and the proposal message is agreed, then the corresponding partial signature is generated for the proposal message and a new random number is generated, and a message containing the corresponding partial signature and the new random number is sent to the initiating terminal;
    if the local random number is consistent with the corresponding random number in the message and the proposal message is not agreed, then a message that the proposal message is refused is sent to the initiating terminal; and
    if the local random number is not consistent with the corresponding random number in the message, then no signature is provided for the proposal message and the local random number is sent to the initiating terminal.

2. The method of claim 1, wherein,
    a premise of repeating the S101, the S102 and the S103 is that: if the partial signatures, the quantity of which is required for the approval of the proposal message, have not been received after a set response time, then a sum of quantity of a node of the participating terminal that does not respond and quantity of a node of the participating terminal that refuses the proposal message is determined, and the S101, S102 and S103 are repeated if the sum is less than quantity required for refusal of the proposal message, otherwise that the proposal message is not approved and that there is no access to generate the aggregate signature are output.

3. The method of claim 1, wherein,
    the generating the challenge number according to the random numbers of all participating terminals further comprises: generating the challenge number according to the random numbers of all participating terminals by using an Ed25519 algorithm.

4. The method of claim 1, wherein,
    the generating the partial signatures for the proposal message further comprises: generating the partial signatures for the proposal message by using an Ed25519 algorithm.

5. The method of claim 1, wherein,
    the S102 further comprises recording the new random number of the corresponding participant, so as to update a random number list of the participating terminals.

6. The method of claim 5, wherein,
    an update method of the random number list of the participating terminals comprises the S101 and the S102.

7. A device, comprising:
    one or more processors;
    a memory configured to store one or more programs; wherein when executed by the one or more processors, the one or more programs cause the one or more processors to implement following steps of:
    at S101, generating a challenge number according to random numbers of all participating terminals, and sending the random numbers corresponding to the participating terminals, the challenge number and a proposal message to the corresponding participating terminals respectively;
    at S102, receiving messages from the participating terminals, and recording the partial signatures if the messages contain partial signatures;
    at S103, determining whether quantity of the recorded partial signatures meets quantity required for approval of the proposal message;
    if the quantity of the recorded partial signatures meets the quantity required for the approval of the proposal message, then at S104 generating an aggregate signature by combining these partial signatures;
    if the quantity of the recorded partial signatures does not meet the quantity required for the approval of the proposal message, then outputting that the proposal message is not approved and there is no access to generate the aggregate signature, or repeating the S101, S102 and S103; wherein:
    between the S101 and the S102, each of the participating terminals receives a message sent by the initiating terminal and containing the corresponding random number, the challenge number and the proposal message, and determines whether a local random number is consistent with the corresponding random number in the message;

if the local random number is consistent with the corresponding random number in the message and the proposal message is agreed, then the corresponding partial signature is generated for the proposal message and a new random number is generated, and a message containing the corresponding partial signature and the new random number is sent to the initiating terminal;

if the local random number is consistent with the corresponding random number in the message and the proposal message is not agreed, then a message that the proposal message is refused is sent to the initiating terminal; and if the local random number is not consistent with the corresponding random number in the message, then no signature is provided for the proposal message and the local random number is sent to the initiating terminal.

8. The device of claim 7, wherein, a premise of repeating the S101, the S102 and the S103 is that: if the partial signatures, the quantity of which is required for the approval of the proposal message, have not been received after a set response time, then a sum of quantity of a node of the participating terminal that does not respond and quantity of a node of the participating terminal that refuses the proposal message is determined, and the S101, S102 and S103 are repeated if the sum is less than quantity required for refusal of the proposal message, otherwise that the proposal message is not approved and that there is no access to generate the aggregate signature are output.

9. The device of claim 7, wherein, the generating the challenge number according to the random numbers of all participating terminals further comprises: generating the challenge number according to the random numbers of all participating terminals by using an Ed25519 algorithm.

10. The device of claim 7, wherein, the generating the partial signatures for the proposal message further comprises: generating the partial signatures for the proposal message by using an Ed25519 algorithm.

11. The device of claim 7, wherein, the S102 further comprises recording the new random number of the corresponding participant, so as to update a random number list of the participating terminals.

12. The device of claim 11, wherein, an update method of the random number list of the participating terminals comprises the S101 and the S102.

* * * * *